(No Model.)
C. JOHNSTON.
Drop Light.
No. 237,287. Patented Feb. 1, 1881.
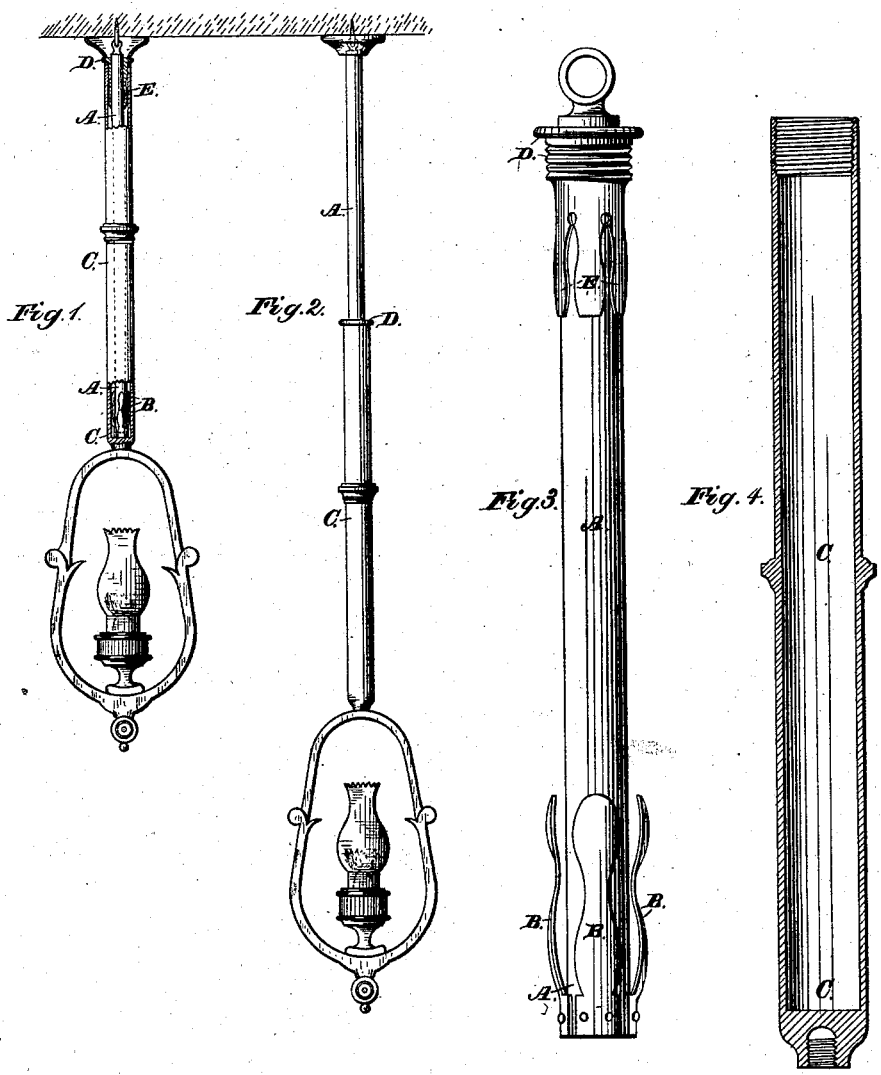
Attest.
Jas. E. Hutchinson.
J. A. Rutherford.
Inventor.
Clark Johnston
by James L. Norris
Atty.

UNITED STATES PATENT OFFICE.

CLARK JOHNSTON, OF ROCHESTER, NEW YORK.

DROP-LIGHT.

SPECIFICATION forming part of Letters Patent No. 237,287, dated February 1, 1881.

Application filed December 4, 1880. (No model.)

*To all whom it may concern:*

Be it known that I, CLARK JOHNSTON, a citizen of the United States, residing at Rochester, in the county of Monroe and State of New York, have invented new and useful Improvements in Drop-Lights, of which the following is a specification.

My invention relates to devices for retaining at any desired point the drop or sliding portion of an extensible drop-light support, its object being to prevent vibration of the drop with respect to the fixed portion, to secure an easy movement of said drop, and to insure its retention at the point to which adjusted.

My invention is designed for use in connection with oil-lamps.

It consists in the combination, in an extensible drop-light support, of an inner rod or tube having attached springs diverging from its periphery, and a tube surrounding said rod and springs and compressing the latter, and having springs extending inwardly from its inner periphery and bearing upon said rod, as hereinafter particularly described, and the operation thereof explained.

In the accompanying drawings, Figure 1 is a view of a drop-light constructed according to my invention, its extensible support being shown partly in section. Fig. 2 is a view of the same with the drop lowered. Fig. 3 is a view of the stationary rod separated from the drop-tube. Fig. 4 is a view of the drop-tube and its rod-clamping springs separated.

The letter A indicates a rod, which is to be secured at its upper end to a ceiling or bracket. To the lower end of this rod are secured the lower ends of spring-plates B, at about equal distances apart around its periphery, said spring-plates extending alongside the rod and diverging therefrom at their free ends.

C is a tube surrounding the rod A and springs B, and having at its lower end means for the attachment of a lamp-frame. Into the upper end of the tube C is screwed an annular gland, D, through which the rod A extends, and from the inner edge of this gland extend spring-fingers E, which bear upon the periphery of said rod.

The spring-plates B, attached to the rod A, and bearing against the inner periphery of the tube, and the spring-fingers E, secured to the tube and bearing against the periphery of the rod, create sufficient friction to insure the retention of the drop at any point to which it may be extended; and this friction being distributed at different points and on different surfaces, there is not that wear and abrasion of the surface which results when retaining-springs gripe a rod or tube at one point with sufficient force to hold it. Also, these springs, being located at different points, hold the drop true in its movement and prevent it from vibrating; for if the gland-passage be sufficiently large to permit a free movement of the rod A it will at the same time, if the spring-fingers are left off, allow a slight lateral movement of the upper end of the tube, which will, of course, be greatly multiplied at its lower end. The spring-fingers, however, by their close pressure upon the rod, prevent lateral movement of the tube, except it be purposely or accidentally caused.

In the drawings I have shown the extensible support with but one extension-joint; but it is obvious that if a tube be used instead of the rod A it may surround and move upon another tube or rod in the same manner that it is itself surrounded and moved upon by the tube C, the inclosed tube or rod in each case being provided at its lower end with springs substantially similar in construction and operation to the spring-plates B, and the inclosing-tube having spring-fingers like the fingers D. I do not, however, confine myself to the particular construction and arrangement of the spring-plates and spring-fingers as now shown and described, as it is obvious that they may be modified without departing from the principle of my invention.

I would further state that the extension-support may be inverted from the position shown in the drawings, the tube then being fixed to the ceiling or bracket and the inner rod becoming the moving or extension portion, to which the lamp-frame may be attached.

Heretofore the outer tube of a drop-light has been provided at its lower end with a washer carrying two spring-plates, which bear against the inner sliding tube, said washer being confined against the end of the outer tube by a screw-cap; but such is not claimed by me. The inner sliding tube or rod of a drop-light has also been provided at its upper end with attached springs, carrying at their free ends friction-rollers, which bear against the interior of the outer tube; but such is not my invention.

What I claim is—

The combination of the rod A, having the diverging spring-plates B secured near its lower end, and the tube C, having the spring-fingers E extending inwardly from a point near its upper end, said spring-plates B bearing upon the inner surface of the tube C, and said spring-fingers E bearing upon the periphery of the inner rod, substantially as described.

In testimony whereof I have hereunto set my hand in the presence of two subscribing witnesses.

CLARK JOHNSTON.

Witnesses:
    LEWIS J. DONIVAN,
    H. P. JOHNSTON.